United States Patent
Inoue et al.

(10) Patent No.: US 10,448,202 B2
(45) Date of Patent: Oct. 15, 2019

(54) DYNAMIC BOUNDARY SETTING

(71) Applicant: INTERNATIONAL BUSINESS MACHINES CORPORATION, Armonk, NY (US)

(72) Inventors: Tadanobu Inoue, Tokyo (JP); Akira Koseki, Tokyo (JP); Takao Moriyama, Tokyo (JP); Kohji Takano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/457,100

(22) Filed: Mar. 13, 2017

(65) Prior Publication Data

US 2018/0262875 A1     Sep. 13, 2018

(51) Int. Cl.
| | |
|---|---|
| *H04W 4/021* | (2018.01) |
| *G05B 19/418* | (2006.01) |
| *H04W 16/00* | (2009.01) |
| *H04W 36/00* | (2009.01) |

(52) U.S. Cl.
CPC ........ *H04W 4/022* (2013.01); *G05B 19/4185* (2013.01); *H04W 16/00* (2013.01); *G05B 2219/25127* (2013.01); *H04W 36/0005* (2013.01)

(58) Field of Classification Search
CPC ....... H04W 4/021; H04W 4/02; H04W 64/00; H04W 4/022; H04W 4/043
See application file for complete search history.

(56) References Cited

U.S. PATENT DOCUMENTS

| | | | |
|---|---|---|---|
| 6,881,957 B2 | 4/2005 | Dougherty et al. | |
| 2007/0222663 A1 | 9/2007 | Humphrey et al. | |
| 2010/0222925 A1 | 9/2010 | Anezaki | |
| 2011/0085680 A1* | 4/2011 | Chen | G06Q 30/02 381/107 |
| 2013/0099977 A1* | 4/2013 | Sheshadri | H04W 4/021 342/450 |
| 2017/0241660 A1* | 8/2017 | Sekar | F24F 11/0009 |

FOREIGN PATENT DOCUMENTS

EP     0 755 034 B1     10/2001

OTHER PUBLICATIONS

Joshi, A. et al., "Experimental Validation of Cooperative Environmental Boundary Tracking with On-board Sensors" 2009 American Control Conference (Jun. 2009) pp. 2630-2635.
Sravani, K. et al., "Human Motion Detection Using Passive Infra Red Sensor" International Journal of Research in Computer Applications & Information Technology (Mar.-Apr. 2014) pp. 28-32, vol. 2, Issue 2.

\* cited by examiner

*Primary Examiner* — Margaret G Mastrodonato
(74) *Attorney, Agent, or Firm* — Tutunjian & Bitetto, P.C.; Vazken Alexanian

(57) ABSTRACT

A method, a system, and a computer program product provide for changing a boundary between zones. This includes setting a location of a boundary which defines a part of a zone; detecting that an object moves into the zone across the boundary; and in response to the detection, changing the location of the boundary in a direction away from the object, compared to the location of the boundary before the change.

16 Claims, 16 Drawing Sheets

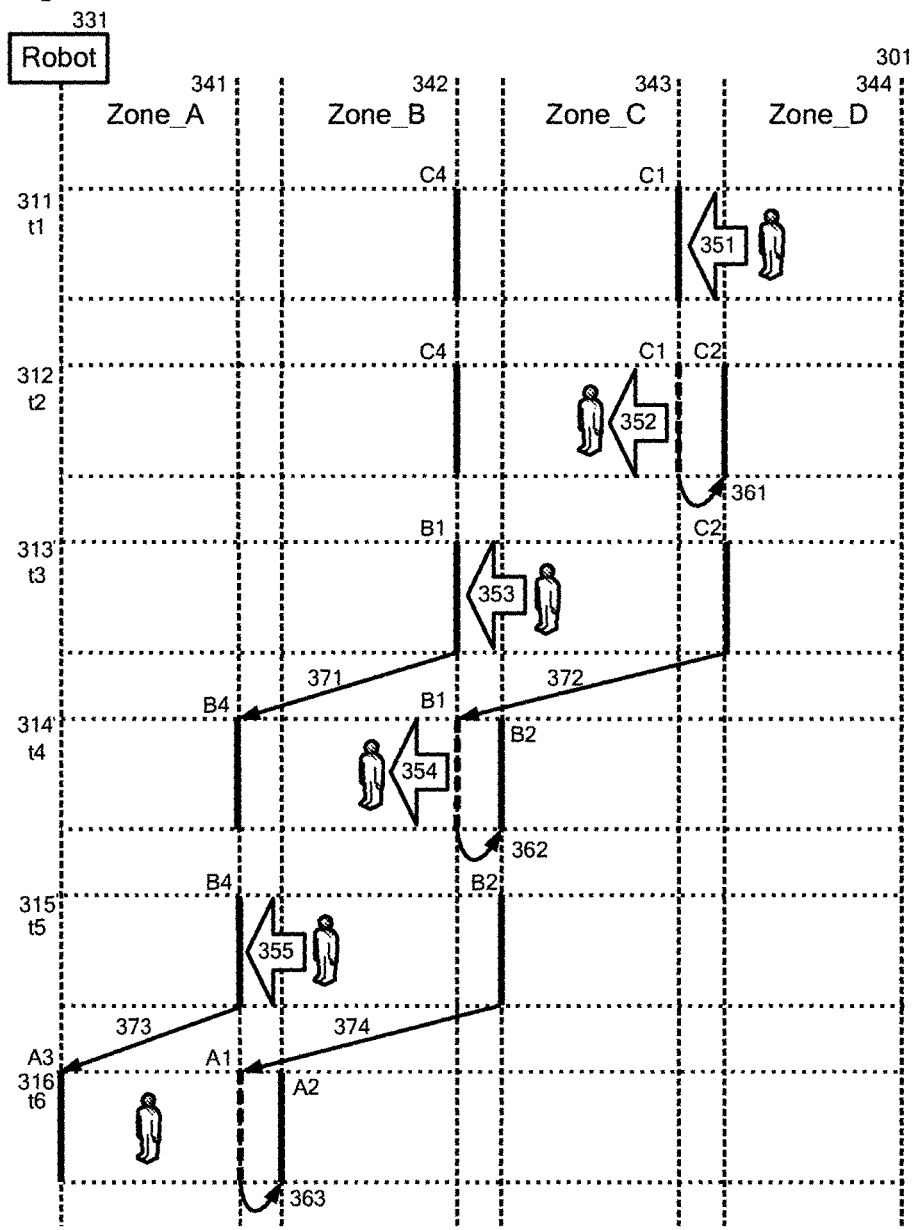

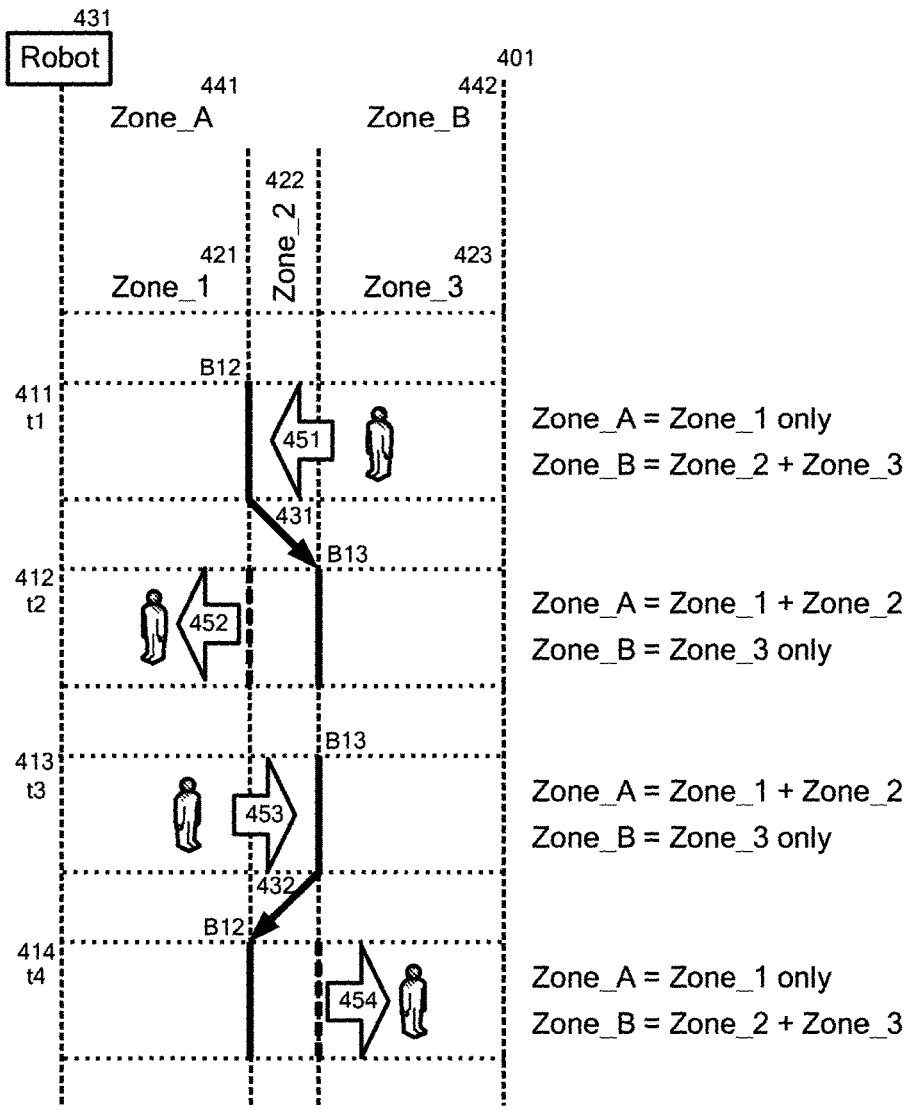

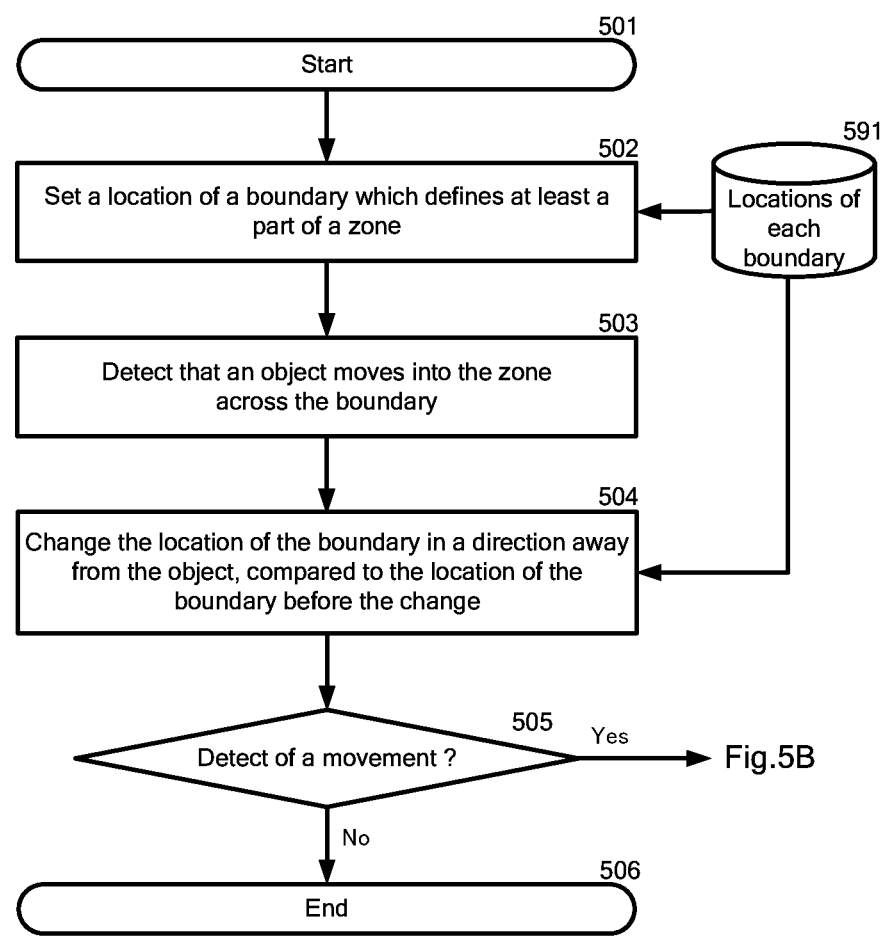

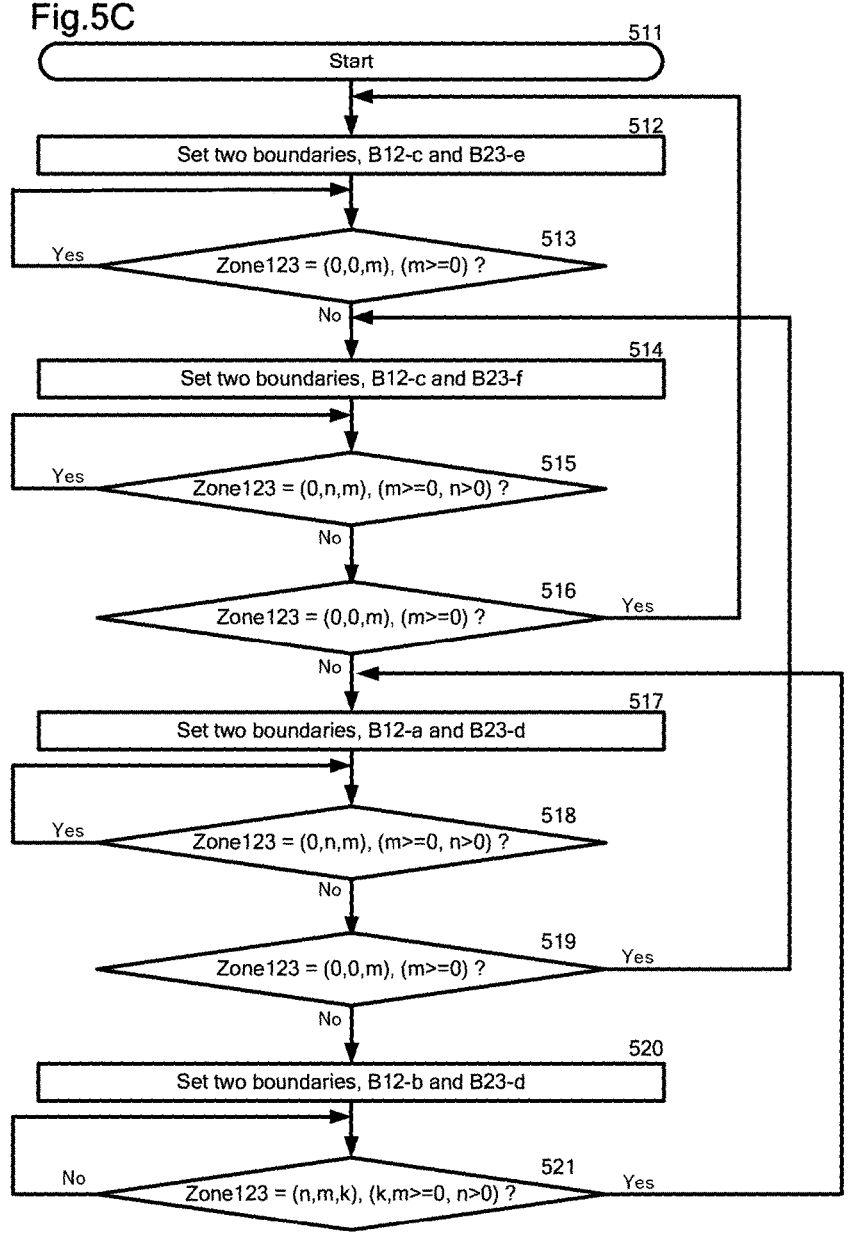

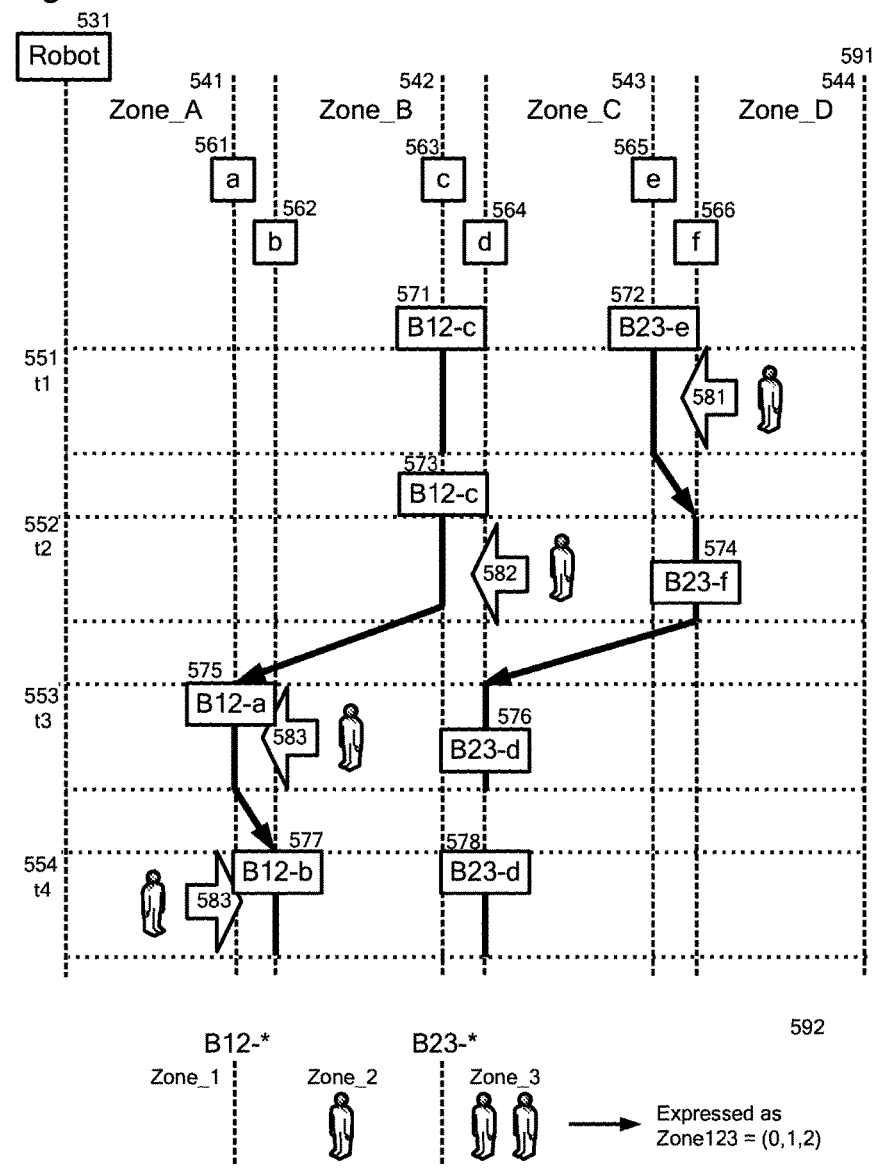

Fig. 7A
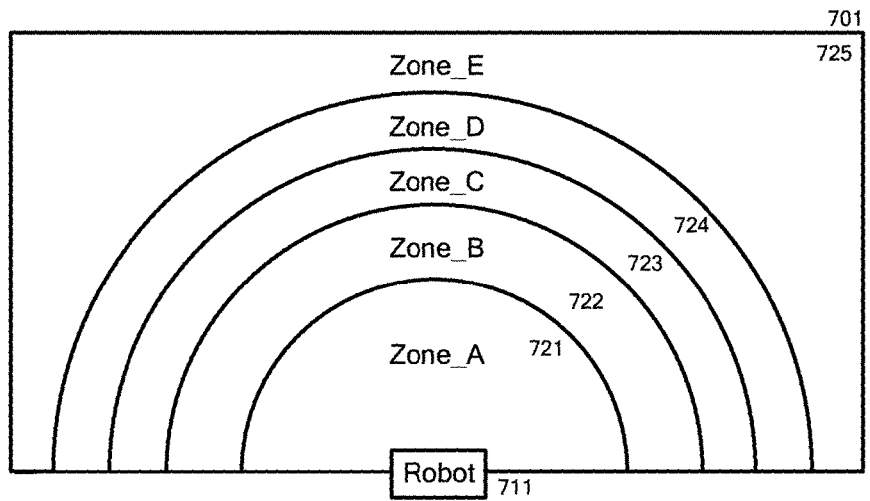
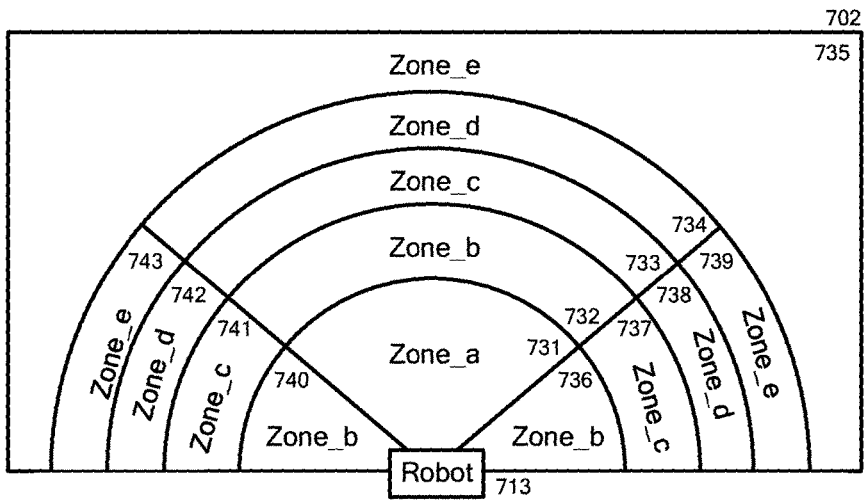

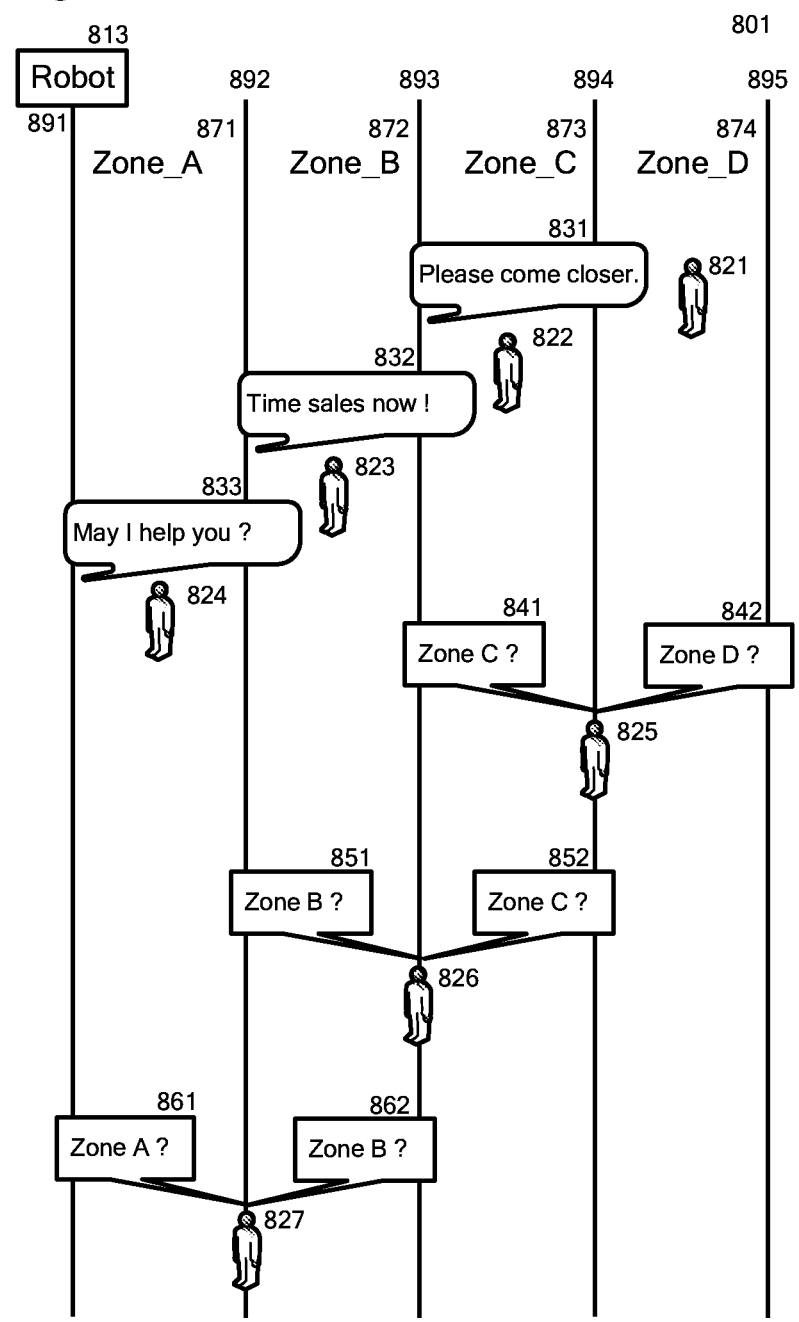

DYNAMIC BOUNDARY SETTING

BACKGROUND

Technical Field

This invention relates generally to a boundary between zones, and, more specifically to a technique for changing a boundary between zones.

Related Art

There are many cases in which we would like to let a robot provide services when a user is approaching the robot. For example, the following situations are considered: in a case where a user is approaching a robot, the robot talks with a user or takes an action to the user in a different manner, depending on a distance between the robot and the user; and in a case where a user is approaching a robot more closely, the robot starts a question-and-answer session.

Some types of robots can detect a distance between the robot and a target object using a sensor, such as a distance sensor or depth sensor, and then identify the number of target objects in a plurality of zones and a movement of each target object between two zones among a plurality of zones.

The above-mentioned sensors can measure the distance using infrared or supersonic waves. However, these sensors employed on commercial level robots provide lower performance. Accordingly, it is likely that these sensors have perturbation in measured data affected by noise.

This noise may include a chattering problem on a zone detection in a case where services from a robot depend on a distance between the robot and a target object and the target object is near a boundary between zones.

SUMMARY

According to one aspect of the present invention, an embodiment of the present invention provides a computer-implemented method for changing a boundary between zones. The method comprises: setting a location of a boundary which defines at least a part of a zone, detecting that an object moves into the zone across the boundary; and in response to the detection, changing the location of the boundary in a direction away from the object, compared to the location of the boundary before the change.

According to another aspect of the present invention, a system, such as a robot including a computer system, comprising a processor and a memory storing a program of instructions executable by the processor to perform one or more methods described herein may be provided.

According to another aspect of the present invention, a computer program product comprising a computer readable storage medium storing a program of instructions executable by a system to perform one or more methods described herein also may be provided.

BRIEF DESCRIPTION OF THE DRAWINGS

The disclosure will provide details in the following description of preferred embodiments with reference to the following figures.

FIGS. 3A and 3B illustrate another embodiment of a diagram of a process for changing a boundary between zones.

FIG. 4 illustrates a further another embodiment of a diagram of a process for changing a boundary between zones.

FIGS. 5A and 5B illustrate an embodiment of a flowchart of a process for changing a boundary between zones.

FIG. 5C illustrates another embodiment of a flowchart of a process for changing a boundary between zones.

FIG. 5D illustrates an embodiment of a diagram according to the flowchart described in FIG. 5C.

FIGS. 7A and 7B illustrate different examples of zones which may be used in an embodiment of the present invention.

FIG. 8 illustrates an example of a chattering problem on a zone detection in a case where a target object stands nearby a boundary between zones.

DETAILED DESCRIPTION

Figure 1:
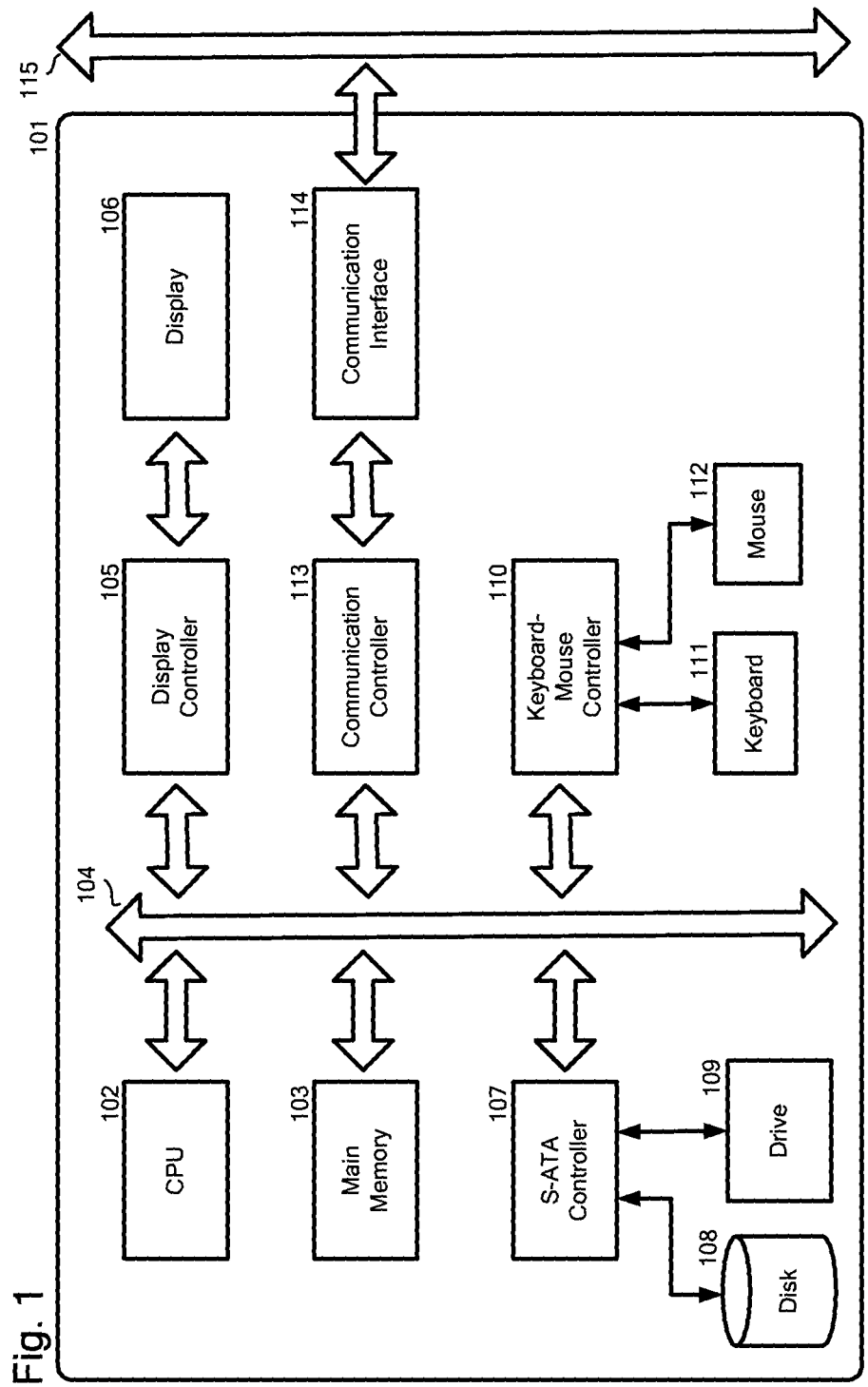
FIG. 1 illustrates an exemplified basic block diagram of a computer hardware which can be equipped with a robot according to an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term, "a zone" may refer to an area which may be used for detecting a location of an object or detecting a distance between an object and a detector mentioned below. The zone is defined using one, two or more boundaries. Each zone can be identified using one or more boundaries by a robot used according to an embodiment of the present invention. A space in front of the robot can be divided into configurable zones. The zone may be defined by using a coordinate(s) that is relative to a detector which may be equipped with the robot.

The term, "a boundary", may refer to at least a part of each zone. Each boundary locates between two zones or among three or more zones. The boundary may be set using information on boundary locations. The information on each of boundary locations may be set in advance. Alternatively, the information on each of the boundary locations may be dynamically calculated in response to a detection of movement of an object. Each boundary can be identified by the robot.

The term, "an object" or "an entity", may refer to a target object which can be detectable by any detector used according to an embodiment of the present invention. The term, "an object" and "an entity" can be used interchangeably. The object may comprise a moving object or a stationary object. The moving object may refer to an object whose position is changed as time passes. The moving object may be, for example, but not limited to, a human, animal or other creatures, or a machine which can move itself. The stationary object may refer to an object which cannot move itself.

The term, "a detector", may refer to any means which can detect an object, a movement of the object or a combination thereof using a sensor, such as a sensor using infrared or supersonic waves. The sensor may be, for example but not limited to, a distance sensor or depth sensor. The detector may comprise one or more sensors.

The term, "a robot", may refer to any system with which one or more detectors may be equipped or to which one or more detectors may be connected. The robot may be arranged to perform an embodiment of the process for changing a boundary between zones according to an embodiment of the present invention. Accordingly, the robot may detect an object and a movement of the object. Further, the robot may identify movements of each object. The robot can move itself or cannot move itself.

With reference now to FIG. 1, FIG. 1 illustrates an exemplified basic block diagram of a computer hardware which can be equipped with a robot according to an embodiment of the present invention.

A computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

The computer (101) may optionally comprise a display (106) such as a liquid crystal display (LCD). The display (106) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The computer (101) may optionally comprise the drive (109). The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

The idea of an embodiment of the present invention can be on the basis of the following perceptions.

Figure 7B:
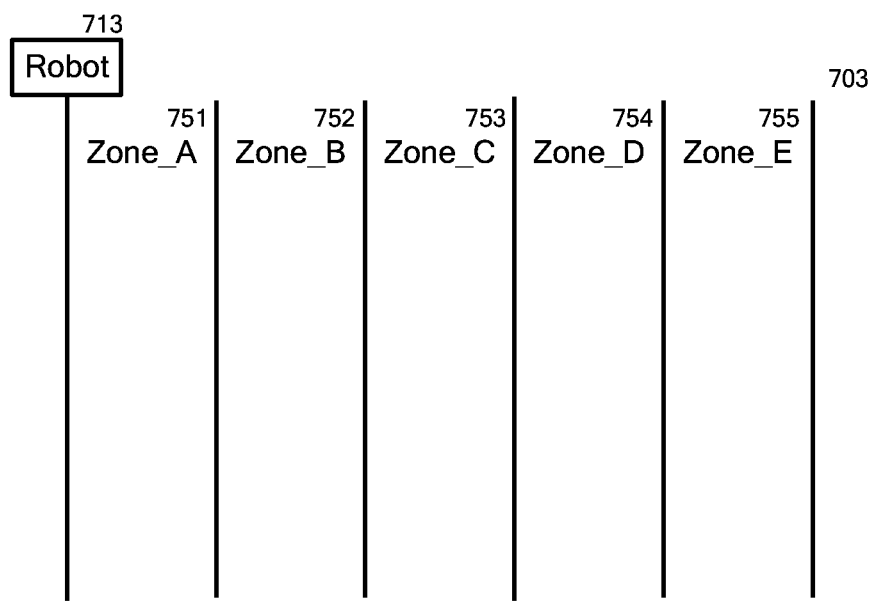

A space in front of a robot can be divided into a plurality of zones, as seen in FIGS. 7A and 7B. The numbers of zones may be set by, for example, an administrator of the robot.

With reference now to FIG. 7A, FIG. 7A illustrates two examples of zones which may be used in an embodiment of the present invention.

In one embodiment (701), the space in front of a robot (711) is divided into Zone_A (721), Zone_B (722), Zone_C (723), Zone_D (724) and Zone E (725). Each zone may be defined using each distance from the robot (711) and a limit angle, such as "90 degrees".

In another embodiment (702), the space in front of a robot (713) is divided into Zone_a (731), Zone_b (732, 736 and 740), Zone_c (733, 737 and 741), Zone_d (734, 738 and 742) and Zone_e (735, 739 and 743). Each zone may be defined using each distance from the robot (713) and a limit angle, such as "45 degrees".

With reference now to FIG. 7B, FIG. 7B illustrates an example of zones which may be represented as only for ease of illustration in replace of the embodiment (701) described in FIG. 7A.

Zone_A (751), Zone_B (752), Zone_C (753), Zone_D (754) and Zone E (755) correspond to Zone_A (721), Zone_B (722), Zone_C (723), Zone_D (724) and Zone E (725) described in FIG. 7A, respectively.

A robot (713) corresponds to the robot (711) described in FIG. 7A.

The robot (713) can detect a distance between the robot (713) and a target object using a sensor. However, there is the following problem on a detection of a zone in a case where the user stands nearby a boundary between zones. The robot can show unstable zone detection among two zones. The robot can detect the user is in one zone after a few seconds when the robot detects the user is in another zone. This problem is called a chattering problem. Examples of the chattering problem are mentioned below.

With reference now to FIG. 8, FIG. 8 illustrates an example of a chattering problem on a zone detection in a case where a target object stands nearby a boundary between zones.

In FIG. 8, the space in front of a robot (813) was divided into the following four zones, defines Zone_A (871), Zone_B (872), Zone_C (873) and Zone_D (874). Each zone has a plurality of boundaries and each boundary defines at least a part of the zone.

Each zone (871, 872, 873 and 874) may be defined using each distance from the robot (813) and a limit angle, such as "90 degrees". Please note that each zone described in FIG. 8 is illustrated in a form of a linear shape instead of the semi-ellipsoid shape only for ease of illustration.

Each zone (871, 872, 873 and 874) may be set in a form of a semi-ellipsoid shape, as seen in the embodiment (701) described in FIG. 7A, by setting one boundary location for each boundary. The setting of this boundary is made by fixing the boundary location.

The robot (813) can detect an object in a zone by setting the boundaries of the zone.

For example, in a case where two boundaries are set to a location (891) and a location (892), Zone_A (871) may be defined and, accordingly, the robot (813) can detect an object in Zone_A (871). Similary, in a case where two boundaries are set to a location (892) and a location (893), Zone_B (872) may be defined and, accordingly, the robot (813) can detect the object in Zone_A (872). Similary, in a case where two boundaries are set to a location (893) and a location (894), Zone_C (873) may be defined and, accordingly, the robot (813) can detect the object in Zone_A (873). Similary, in a case where two boundaries are set to a location (894) and a location (895), Zone_D (874) may be defined and, accordingly, the robot (813) can detect the object in Zone_A (874).

Let us suppose that a user is now in Zone_D (874) which is relatively far from the robot (813).

In a case where a user moves into Zone_D (874), the robot (813) detects (821) that the user is in Zone_D (874) and then takes an action according to rules predefined for each zone. In this case, the robot (813) does not take any action to the user.

Similarly, in a case where the user moves into Zone_C (873), the robot (813) detects (822) that the user is in Zone_C (873) and then takes an action according to the above-mentioned rules. In this case, the robot (813) talks to the user, for example "please come closer" (831).

Similarly, in a case where the user moves into Zone_B (872), the robot (813) detects (823) that the user is in Zone_B (872) and then takes an action according to the above-mentioned rules. In this case, the robot (813) talks to the user, for example "Time sales now" (832).

Similarly, in a case where the user moves into Zone_A (871), the robot (813) detects (824) that the user is in Zone_A (871) and then takes an action according to the above-mentioned rules. In this case, the robot (813) starts a question and answer session to the user, for example "May I help you?" (833).

In these ways, the robot can detect a movement of the user and then provide different services, depending on the zone to which the user is now belonging.

In FIG. 8, the chattering problem may occur, for example, in the following cases.

In a case where the user stands nearby the boundary (825) between Zone_C (873) and Zone_D (874), the robot (813) cannot identify whether the user is in Zone_C (873) or Zone_D (874) stably. The robot (813) can change the zone detection result of the user easily between two zones, 841 and 842. Accordingly, the chattering problem may occur between 841 and 842.

Similary, in a case where the user stands nearby the boundary (826) between Zone_B (872) and Zone_C (873), the robot (813) cannot identify whether the user is in Zone_B (872) or Zone_C (873) stably. The robot (813) can change the zone detection result of the user easily between two zones, 851 and 852. Accordingly, the chattering problem may occur between 851 and 852.

Similary, in a case where the user stands nearby the boundary (827) between Zone_A (871) and Zone_B (872), the robot (813) cannot identify whether the user is in Zone_A (871) or Zone_B (872) stably. The robot (813) can change the zone detection result of the user easily between two zones, 861 and 862. Accordingly, the chattering problem may occur between 861 and 862.

Accordingly, there is a need to avoid the chattering problem and realize a stable detection of a zone.

Hereinafter, embodiments of the present invention will be described with reference to the following FIGS. 2A to 2D, FIGS. 3A and 3B, FIG. 4, FIGS. 5A to 5D, and FIG. 6.

In the embodiments, let us suppose a case that a robot can detect three zones simultaneously by setting two boundaries. The robot will identify the zone where the closest user to the robot is located among four zones stably by setting the two boundaries dynamically. The setting of a boundary between the zones among the two boundaries can be made by in response to detection of a movement of a user across the boundary, changing a location of this boundary in a direction away from the object, compared to the location of this boundary before the change so as not to cause a chattering problem.

Embodiments of a diagram of a process for changing a boundary between zones are described in each of FIGS. 2A and 2B, FIGS. 3A and 3B, and FIG. 4.

Figure 2A:
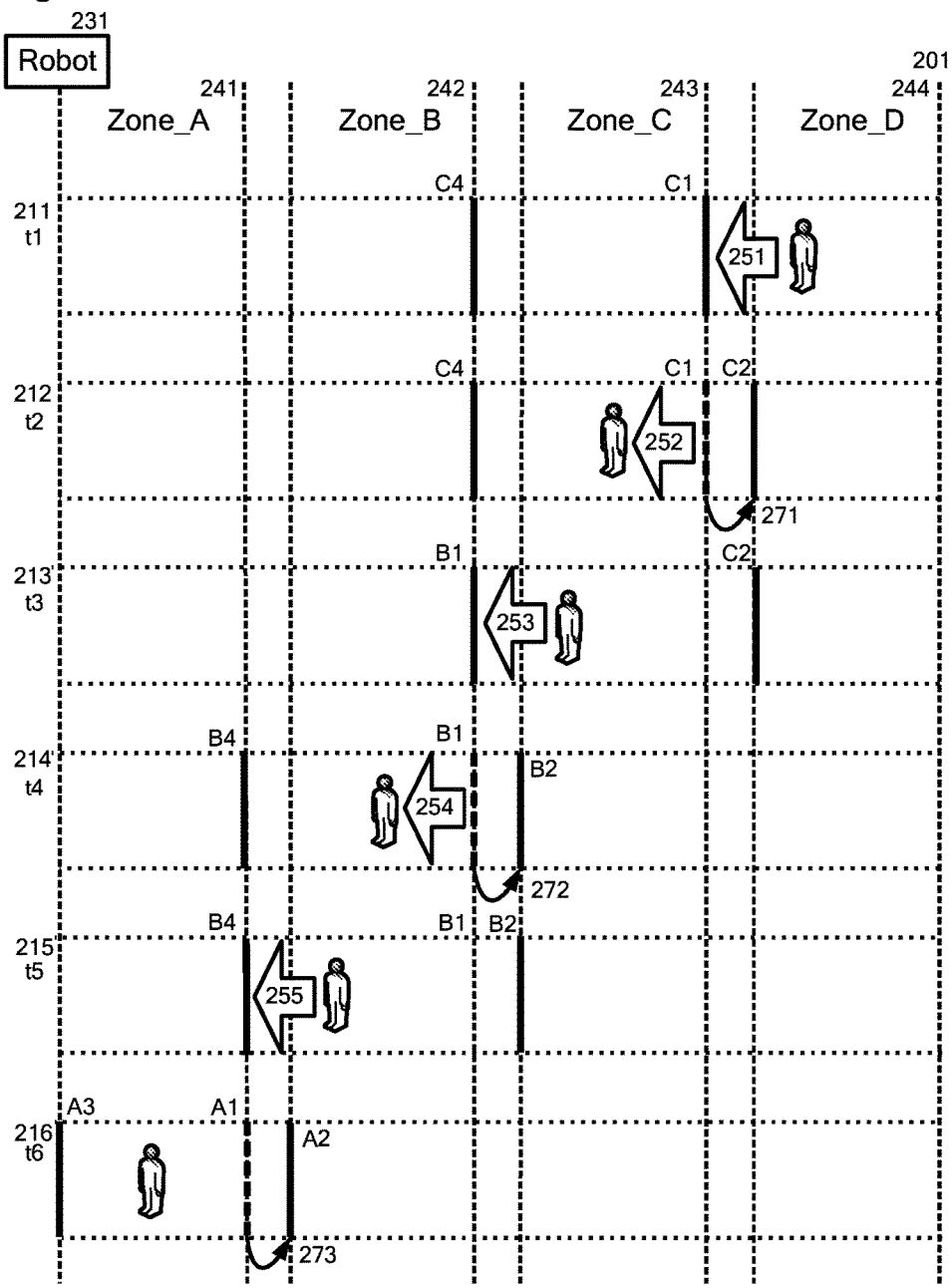
FIGS. 2A, 2B, 2C and 2D illustrate an embodiment of a diagram of a process for changing a boundary between zones.
Figure 2B:
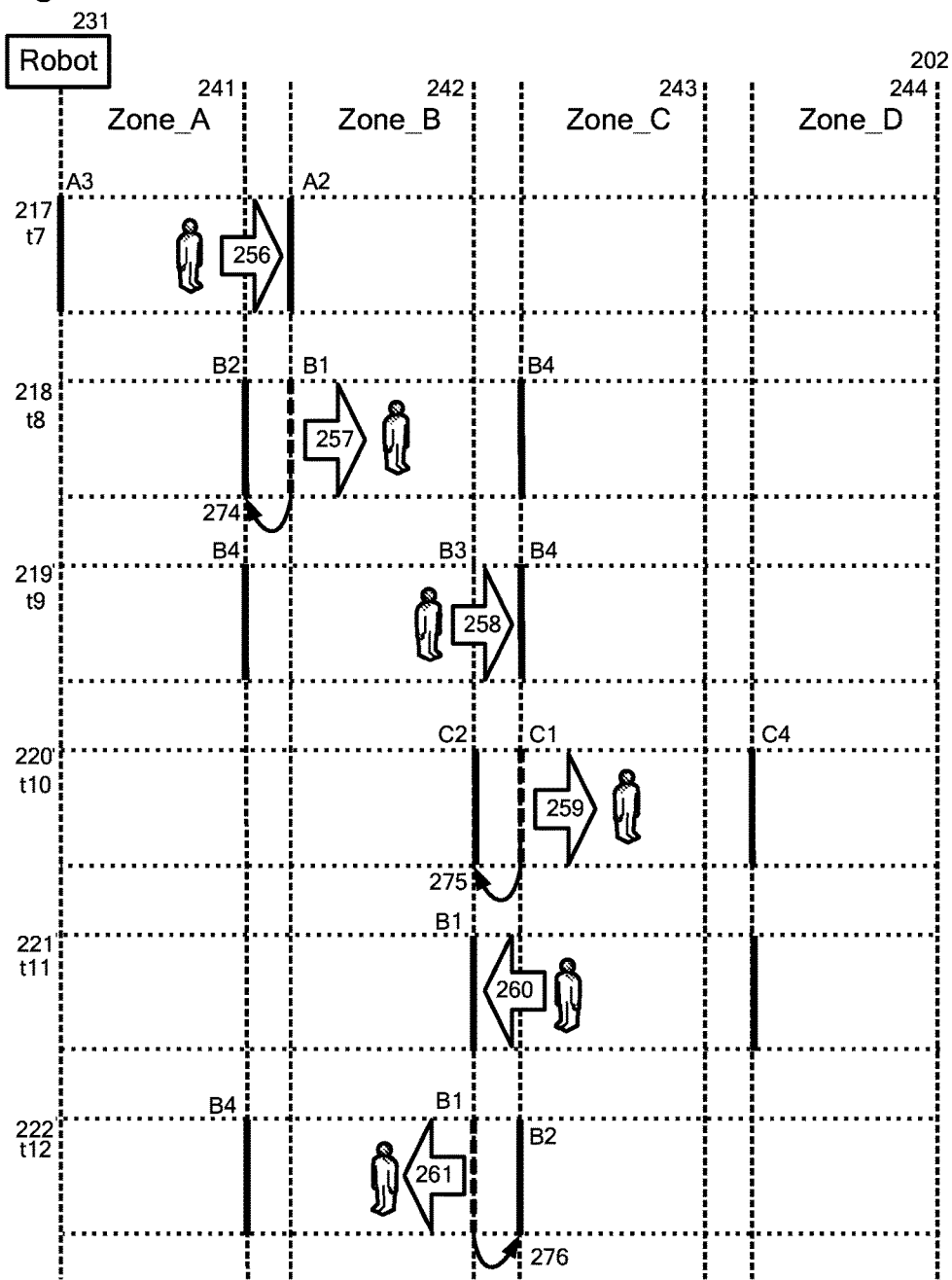

FIGS. 2A and 2B illustrate an embodiment of a diagram of a process for changing a boundary between zones, according to a time sequence.

Prior to explaining this diagram, an embodiment of the present invention will be explained first by referring to FIGS. 2C and 2D, which may be a part described in FIGS. 2A and 2B, respectively.

Figure 2C:
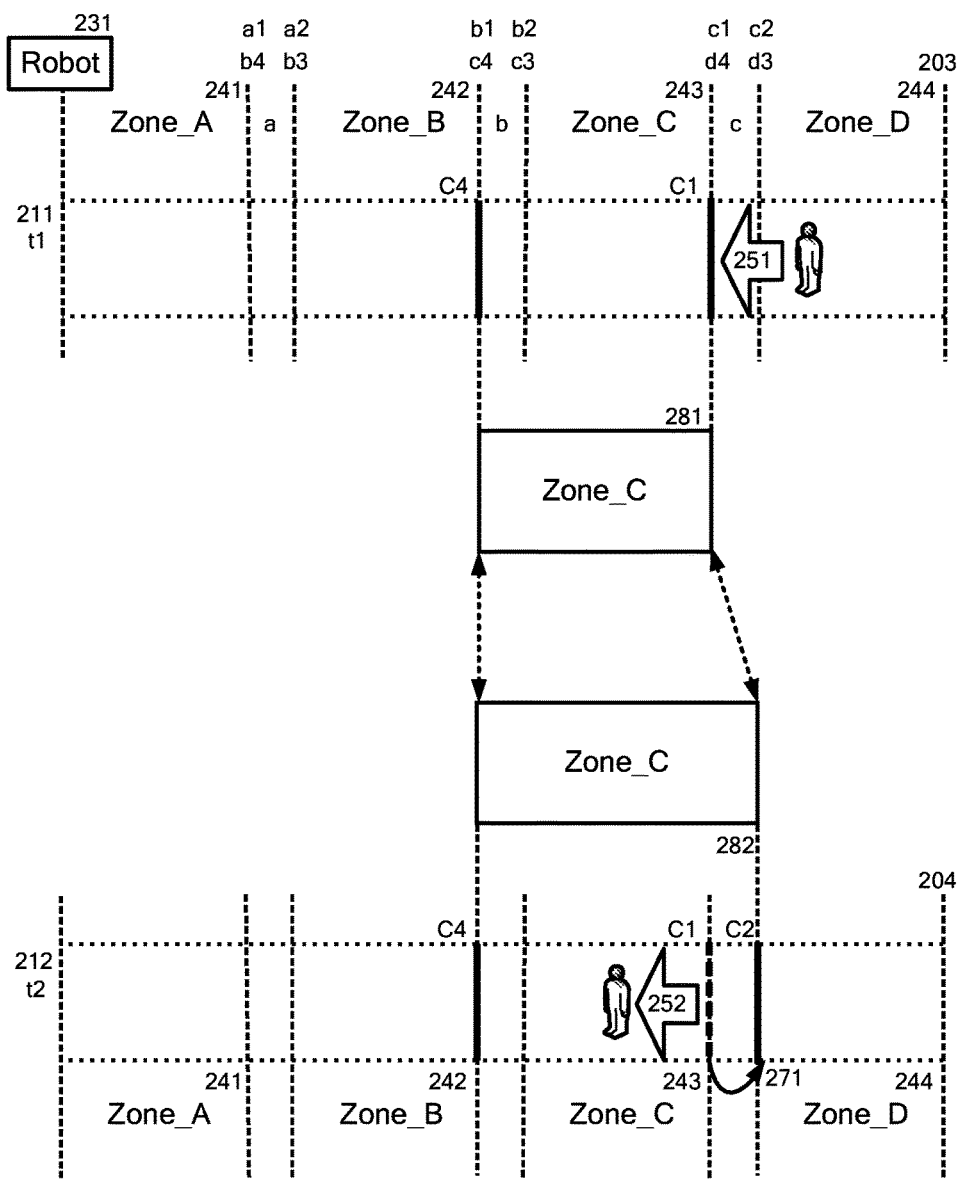
Figure 2D:
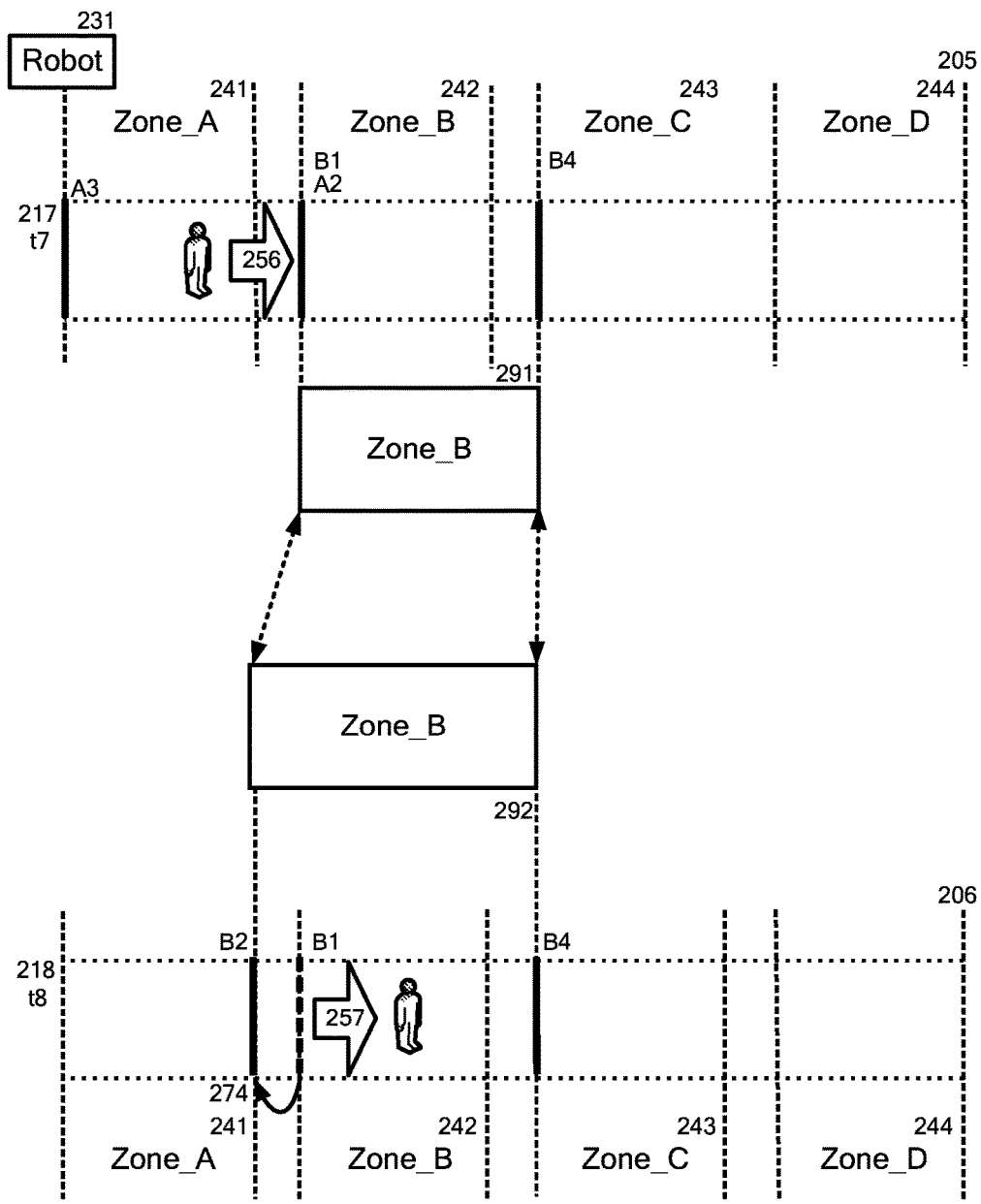

In FIGS. 2C and 2D, the space in front of a robot (231) was divided into the following four zones: Zone_A (241), Zone_B (242), Zone_C (243) and Zone_D (244). Each zone has a plurality of boundaries and each boundary defines at least a part of the zone.

Each zone (241, 242, 243 and 244) may be defined using each distance from the robot (231) and a limit angle, such as "90 degrees". Please note that each zone described in FIG. 2C is illustrated in a form of a linear shape instead of the semi-ellipsoid shape only for ease of illustration.

Each Zone (241, 242, 243 and 244) may be set, for example, in a form of a semi-ellipsoid shape, as seen in the embodiment (701) described in FIG. 7A by setting one boundary location among two boundaries locations for each boundary, according to an embodiment of the present invention. The setting of this boundary can be made by changing the location of the boundary location between an inside-boundary location and an outside-boundary location, both of which are explained below.

In an embodiment of the present invention, each boundary for a zone is set using one location among two boundary locations: i.e., an inside-boundary location and an outside-boundary location. Either of the inside-boundary location or the outside-boundary location can be used for changing a location of one boundary for a zone. The change of the location of this boundary may be done in a case where an object moves across the boundary between zones.

These two boundary locations are set in advance and may be stored in a storage for storing locations of each boundary.

Alternatively, these two boundary locations are dynamically calculated in response to a detection of a moving of an object.

As seen in FIG. 2C, a buffer zone, a, is provided between Zone_A (241) and Zone_B (242). The buffer zone, a, can be used to define an inside-boundary location, a1, and an outside-boundary location, a2, for the right-side boundary of Zone_A (241) and further to define an inside-boundary location, b3, and an outside-boundary location, b4, for the left-side boundary of Zone_B (242).

Similarly, a buffer zone, b, is provided between Zone_B (242) and Zone_C (243). The buffer zone, b, can be used to define an inside-boundary location, b1, and an outside-boundary location, b2, for the right-side boundary of Zone_B (242) and further to define an inside-boundary location, c3, and an outside-boundary location, c4, for the left-side boundary of Zone_C (243).

Similarly, a buffer zone, c, is provided between Zone_C (243) and Zone_D (244). The buffer zone, c, can be used to define an inside-boundary location, c1, and an outside-boundary location, c2, for the right-side boundary of Zone_C (243) and further to define an inside-boundary location, d3, and an outside-boundary location, d4, for the left-side boundary of Zone_D (244).

As seen in FIG. 2C, at t1 (211), the boundary location C1 corresponds to an inside-boundary location for the right-side boundary of Zone_C (243) and is used for setting the right-side boundary of Zone_C (243) so as to decrease a size of Zone_C from Zone_C (282) to Zone_C (281). Meanwhile, at t2 (212), the boundary location C2 corresponds to an outside-boundary location for the right-side boundary of Zone_C (243) and is used for setting the right-side boundary of Zone_C (243) so as to increase a size of Zone_C from Zone_C (281) to Zone_C (282). Accordingly, the size (see 281) of Zone_C (243) in which the boundary is set at the inside-boundary location, C1, is smaller than that (see 282) of Zone_C (243) in which the boundary is set at the outside-boundary location, C2.

As seen in FIG. 2D, at t7 (217), the boundary location B1 corresponds to an inside-boundary location for the left-side boundary of Zone_B (242) and is used for setting the left-side boundary of Zone_B (242) so as to decrease a size of Zone_B from (292) to Zone_B (291). Meanwhile, at t8 (218), the boundary location B2 corresponds to an outside-boundary for the left-side boundary of Zone_B (242) and is used for setting the left-side boundary of Zone_B (242) so as to increase a size of Zone_B (242) from Zone_B (291) to Zone_B (292). Accordingly, the size (see 291) of Zone_B in which the boundary is set at the inside-boundary location, B1, is smaller than that (see 292) of Zone_B (242) in which the boundary is set at the outside-boundary location, B2.

The robot (231) can detect three zones simultaneously by setting two boundaries, and it will identify the zone where the closest user to the robot is located among four zones stably by setting boundaries dynamically. A user comes close to the robot from far (see FIG. 2A) and then she or he goes out from the robot and then comes close to the robot again (see FIG. 2B).

With reference now back to FIG. 2A, let us suppose the situation that nobody is in Zone_A (241), Zone_B (242), and Zone_C (243) but a user is in Zone_D (244). In FIG. 2A, t1 to t6 (211 to 216) denotes a time sequence number, tn, where n is a positive integer.

In this situation, the robot (231) sets boundaries sets: one boundary for the right-side boundary of Zone_C (243) is set at the boundary location, C1 as an inside-boundary location; and another boundary for the left-side boundary of Zone_C (243) is set at the boundary location, C4, as an outside-boundary location.

In step t1 (211), the user is now moving (251) into Zone_C (243) from Zone_D (244) across the boundary at the boundary location, C1, for the right-side boundary of Zone_C (243).

In step t2 (212), the robot (231) detects that the user moves into Zone_C (243) across the boundary at the boundary location, C1, and then dynamically changes (271) the location of the boundary at the boundary location, C1, from the boundary location, C1, to the boundary location, C2, which is located away from the user, compared to the boundary location, C1. As a result the size of Zone_C (243) increases by changing the location of the boundary from the boundary location, C1, to the boundary location, C2.

In step t3 (213), the user is now moving (253) into Zone_B (242) from Zone_C (243) across the boundary at the boundary location, B1, for the right-side boundary of Zone_B (242) corresponding to the boundary location, C4, for the left-side boundary of Zone_C (243).

In step t4 (214), the robot (231) detects that the user moves into Zone_B (242) across the boundary at the boundary location, B1, and then dynamically changes (272) the location of the boundary at the boundary location, B1, from the boundary location, B1, to the boundary location, B2, which is located away from the user, compared to the boundary location, B1. As a result, the size of Zone_B (242) increases by changing the location of the boundary from the boundary location, B1, to the boundary location, B2.

In step t5 (215), the user is now moving (255) into Zone_A (241) from Zone_B (242) across the boundary at the boundary location, A1, for the right-side boundary of Zone_A (241) corresponding to the boundary location, B4, for the left-side boundary of Zone_A (241).

In step t6 (216), the robot (231) detects that the user moves into Zone_A (241) across the boundary at the boundary location, A1, and then dynamically changes (273) the location of the boundary at the boundary location, A1, from the boundary location, A1, to the boundary location, A2, which is located away from the user, compared to the boundary location, A1. As a result, the size of Zone_A (241) increases by changing the location of the boundary from the boundary location, A1, to the boundary location, A2.

With reference now back to FIG. 2B, let us suppose the situation the user moves in zones. In FIG. 2B, t7 to t12 (217 to 222) denotes the time sequence number after the time sequence number of t1 to t6 (211 to 216) described in FIG. 2A.

In step t7 (217), the user is now moving (256) back into Zone_B (242) from Zone_A (241) across the boundary at the boundary location, A2, for the right-side boundary of Zone_A (241) corresponding to the boundary location, B1, for the left-side boundary of Zone_B (242).

In step t8 (218), the robot (231) detects that the user moves into Zone_B (242) across the boundary at the boundary location, B1, and then dynamically changes (274) the location of the boundary at the boundary location, B1, from the boundary location, B1, to the boundary location, B2, which is located away from the user, compared to the boundary location B1. As a result, the size of Zone_B (242) increases by changing the location of the boundary from the boundary location, B1, to the boundary location, B2.

In step t9 (219), the user is now moving (258) back into Zone_C (243) from Zone_B (242) across the boundary at the boundary location, B4, for the right-side boundary of Zone_B (242) corresponding to the boundary location, C1, for the left-side boundary of Zone_C (243).

In step t10 (220), the robot (231) detects that the user moves into Zone_C (243) across the boundary at the boundary location, C1, and then dynamically changes (275) the location of the boundary at the boundary location, C1, from the boundary location, C1, to the boundary location, C2, which is located away from the user, compared to the boundary location, C1. As a result, the size of Zone_B (242) increases by changing the location of the boundary from the boundary location, C1, to the boundary location, C2.

In step t11 (221), the user is now moving (258) again into Zone_B (242) from Zone_C (243) across the boundary at the boundary location, C2, for the left-side boundary of Zone_C (243) corresponding to the boundary location B1 for the right-side boundary of Zone_C (242).

In step t12 (222), the robot (231) detects that the user moves into Zone_B (242) across the boundary at the boundary location B1 and then dynamically changes (276) the location of the boundary at the boundary location, B1, from the boundary location, B1, to the boundary location, B2, which is located away from the user, compared to the boundary location, B1. As a result, the size of Zone_B (242) increases by changing the location of the boundary from the boundary location, B1, to the boundary location, B2.

In an embodiment, the movement of a boundary is made such that in response to the detection that a user moves into the zone across the boundary, the location of the boundary is changed from an inside-boundary location to an outside-boundary location.

In another embodiment, the movement of a boundary is made such that in response to a detection that an object moves into another zone from a certain zone across the boundary, a size of the another zone increases.

The object can be located inside the zone with margin distance by the movement of the boundary and the perturbation of the zone detection nearby the boundary can be avoided.

Accordingly, the chattering problem can be overcome due to a movement of boundary in response to a movement of the object across the boundary.

With reference now to FIG. 3A, FIG. 3A illustrates another embodiment of a diagram of a process for changing a location of a boundary between zones.

The space in front of a robot (331) was divided into the following four zones: Zone_A (341), Zone_B (342), Zone_C (343) and Zone_D (344), which correspond to the following four zones, Zone_A (241), Zone_B (242), Zone_C (243) and Zone_D (244) described in FIGS. 2A to 2D, respectively. Accordingly, the explanations of each zone described in FIGS. 2A to 2D can be applied also to the zones described in FIG. 3A.

The steps t1 (311) and t2 (312) correspond to the steps t1 (211) and t2 (212) described in FIG. 2A, respectively. Accordingly, the explanations of steps t1 (311) and t2 (312) will be omitted here.

In step t3 (313), the user is now moving (353) into Zone_B (342) from Zone_C (343) across the boundary at the boundary location, B1, for the right-side boundary of Zone_B (343) corresponding to the boundary location, C4, for the left-side boundary of Zone_C (343).

In step t4 (314), the robot (331) detects that the user moves into Zone_B (342) across the boundary at the boundary location B1 and then hands over (371 and 372) the two boundaries at the boundary locations, B1 and C2, for left and right-sides boundaries of Zone_C (343) to Zone_B (342) as the two boundaries at the boundary locations, B4 and B1, for the left and right-sides boundaries of Zone_B (342). Accordingly, the two boundaries, B1 and C2, for the left and right-sides boundaries of Zone_C (343) are used for the two boundaries, B4 and B2, for the left and right-sides boundaries of Zone_B (342) after the changing of the location of the boundary.

In step t6 (316), the robot (331) detects that the user moves into Zone_A (341) across the boundary at the boundary location A1 and then hands over (373 and 374) the two boundaries at the boundary locations, B4 and B2, for left and right-side boundaries of Zone_B (342) to Zone_A (341) as the two boundaries at the boundary locations, A3 and A1, for the left and right-side boundaries of Zone_A (341). Accordingly, the two boundaries, B4 and B2, for the left and right-side boundaries of Zone_B (342) are used for the two boundaries, A3 and A2, for the left and right-side boundaries of Zone_B (342) after the changing of the location of the boundary.

In an embodiment, the two boundaries for a zone are handed over between the two zones among the plurality of zones in response to a detection of movement between the zones of the user.

In another embodiment, a boundary which was set to a certain zone prior the movement is used for setting a location of a boundary which defines at least a part of another zone after the movement.

Accordingly, the numbers of boundaries used for detecting a zone by a robot can be decreased by using the handover of the two boundaries.

The object can be located inside the zone with margin distance by the movement of the boundary and the perturbation of the zone detection nearby the boundary can be avoided. Accordingly, the chattering problem can be overcome due to a movement of boundary in response to a movement of the object across the boundary.

Figure 3B:
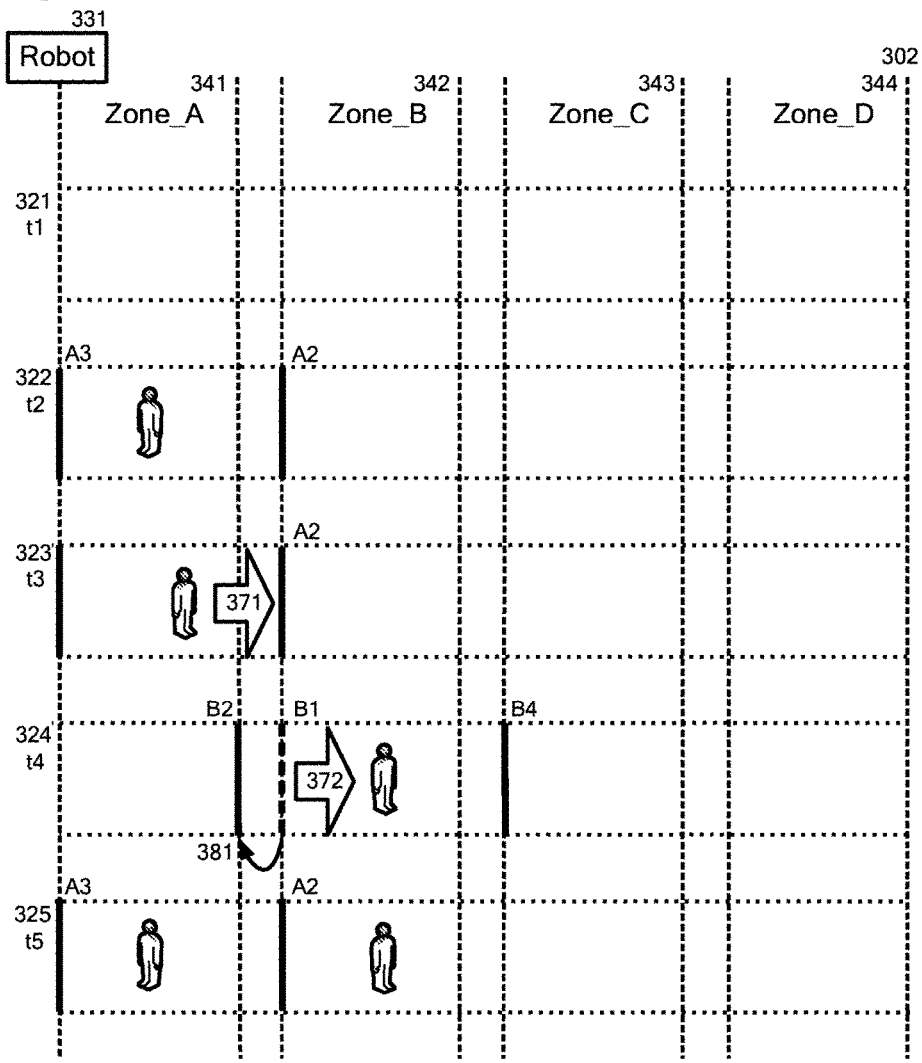

With reference now to FIG. 3B, FIG. 3B illustrates another embodiment of a diagram of a process for changing a location of a boundary between zones.

The four zones, Zone_A (341), Zone_B (342), Zone_C (343) and Zone_D (344) described in FIG. 3B, are the same as those described in FIG. 3A.

In step t1 (311), nobody is in the four zones (341, 342, 343 and 344). Accordingly, no boundary is set in the four zones (341, 342, 343 and 344).

In step t2 (322), a user A is suddenly coming into Zone_A (341). The robot (331) detects that the user A is in Zone_A (341). The robot (331) sets boundaries so that a boundary which locates in a direction of moving the user A is set to increase a size of a zone. Accordingly, in this case, the robot (331) sets one boundary which locates away from the robot (331) at an outside-boundary location, A2, and sets another boundary which locates closer to the robot (331) to at an inside-boundary location, A3 (note that a boundary for the zone which is adjacent to the robot (331) and which is located adjacent to the robot (331) may not have an outside-boundary location).

In step t3 (323), the user A is now moving (371) into Zone_B (342) from Zone_A (341) across the boundary at the boundary location, A2, for the right-side boundary of Zone_A (341) corresponding to the boundary location, B1, for the left-side boundary of Zone_B (342).

In step t4 (324), the robot (331) detects that the user A moves into Zone_B (342) across the boundary at the boundary location, B1, and then dynamically changes (381) the location of the boundary at the boundary location, B1, from the boundary location, B1, to the boundary location, B2, which is located away from the user A, compared to the boundary location, B1, and further sets the boundary at the boundary location, B4. As a result, the size of Zone_B (342) increases by changing the location of the boundary from the boundary location, B1, to the boundary location, B2.

In step t5 (325), another user B is suddenly coming into Zone_A (341). The robot (331) detects that the user B is in Zone_A (341), and the user A is in Zone_B (342). The robot (331) cancels the boundaries, B2 and B4, but sets one boundary for the right-side boundary of Zone_A (341) at the outside-boundary location, A2, and sets another boundary at the inside-boundary location, A3. This is because the robot (331) chooses one user who is the closest to the robot (331) among a plurality of users who are now detected in the zones.

With reference now to FIG. 4, FIG. 4 illustrates another embodiment of a diagram of a process for changing a location of a boundary between zones.

The following three zones are provided: Zone_1 (421), Zone_2 (422) and Zone_3 (423). A robot (431) can identify these three zones by detecting boundaries sets for each zone.

Further, the following two zones are provided: Zone_A (441) and Zone_B (442). Zone_A (441) and Zone_B (442) are used for detecting a location of a user or detecting a distance between the user and a detector. A robot (431) can identify these two zones by identifying Zone_1 (421), Zone_2 (422) and Zone_3 (423).

The robot (431) recognizes Zone_A (441) as a combination of Zone_1 (421) and Zone_2 (422) or as Zone_1 (421) only. The robot (431) recognizes Zone_B (442) as a combination of Zone_3 (423) and Zone_2 (422) or as Zone_3 (423) only.

Accordingly, in a case where Zone_A (441) is recognized as the combination of Zone_1 (421) and Zone_2 (422), Zone_B (442) is recognized as Zone_3 (423) only. In this case, a boundary between Zone_2 (422) and Zone_3 (423) is used as a boundary between Zone_A (441) and Zone_B (442).

Meanwhile, in a case where Zone_A (441) is recognized as Zone_1 (421) only, Zone_B (442) is recognized as the combination of Zone_3 (423) and Zone_2 (422). In this case, a boundary between Zone_1 (421) and Zone_2 (422) is used as a boundary between Zone_A (441) and Zone_B (442).

In FIGS. 4, t1 to t4 (411 to 414) denotes a time sequence number, tn, where n is a positive integer.

Let us suppose that a user is in Zone_3 (423). The robot (431) sets one boundary for the right-side boundary of Zone_B (442) at the boundary location B12 between Zone_1 (421) and Zone_2 (422).

In step t1 (411), the user is now moving (451) into Zone_A (441) from Zone_B (442) across the boundary at the boundary location, B12, between Zone_1 (421) and Zone_2 (422).

In step t2 (412), the robot (431) detects that the user moves into Zone_A (441) across the boundary at the boundary location, B12, and then dynamically changes (431) the location of the boundary at the boundary location, B12, from the boundary location, B12, to the boundary location, B13, which is between Zone_2 (422) and Zone_3 (423) and located away from the user, compared to the boundary location, B12. This means that the boundary at the boundary location, B13 is regarded as the boundary for the right-side boundary of Zone_A (441). Accordingly, the size of Zone_A (441) increases by changing the location of the boundary from the boundary location, B12, to the boundary location, B13.

In step t3 (413), the user is now moving (453) back into Zone_B (442) from Zone_A (441) across the boundary at the boundary location B13 between Zone_2 (422) and Zone_3 (423).

In step t4 (414), the robot (431) detects that the user moves into Zone_B (442) across the boundary at the boundary location, B13, and then dynamically changes (432) the location of the boundary at the boundary location, B13, from the boundary location, B13, to the boundary location, B12, which is between Zone_1 (421) and Zone_2 (422) and located away from the user, compared to the boundary location, B13. This means that the boundary at the boundary location, B12 is regarded as the boundary for the left-side boundary of Zone_B (442). Accordingly, the size of Zone_B (442) increases by changing the location of the boundary from the boundary location, B13, to the boundary location, B12.

In an embodiment, the movement is made such that a location of a boundary is changed from the boundary location, B12, to the boundary location, B13, to increase the size of the zone to which the user is now belonging.

The object can be located inside the zone with margin distance by the movement of the boundary and the perturbation of the zone detection nearby the boundary can be avoided. Accordingly, the chattering problem can be overcome due to a movement of boundary in response to a movement of the object across the boundary.

Figure 5B:
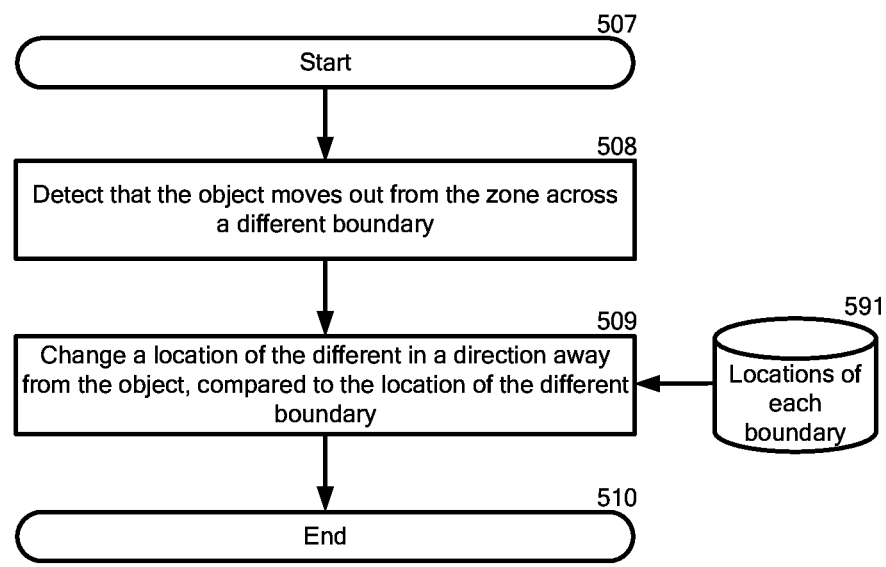

FIGS. 5A and 5B illustrate one embodiment of a flowchart of a process for changing a location of a boundary between zones.

With reference now to FIGS. 5A and 5B, FIGS. 5A and 5B illustrate one embodiment of a flowchart of a process for changing a location of a boundary between zones.

The flowchart can be applied to one zone among a plurality of zones. Accordingly, the same flowchart can be applied also to other zones.

A robot or a computer system may be a subject of each step. Hereinafter, a subject of each step is described as the robot. However, explanations mentioned below are applied also to the computer system as the subject of each step.

In step 501, the robot starts the process for changing a location of a boundary between zones.

In step 502, the robot sets a boundary which defines at least a part of a zone. The boundary may be set at a first boundary location. Further, the boundary may be set at the first position, relative to the computer. Information on the first boundary location may be stored in advance in a storage for storing locations of each boundary (591). Alternatively, information on the first boundary location may be dynamically calculated in response to the location of the boundary being changed. Accordingly, the setting is made by reading information on the first boundary location from the storage (591) and then setting the boundary at the first boundary location using the information.

In step 503, the robot detects that an object moves into the zone across the boundary, using data obtained from one or more sensors.

In step 504, the robot changes the location of the boundary in a direction away from the object, compared to the location of the boundary before the change in response to the detection. The boundary may be set at a second boundary location. Information on the second boundary location may be stored in advance in the storage (591). Alternatively, information on the second boundary location may be dynamically calculated in response to the detection. Accordingly, the movement may be made by reading information on the second boundary location from the storage (591) and then setting the boundary at the second boundary location using the information.

In one embodiment, a location of a boundary may be changed such that a size of the zone increases.

In step 505, the robot judges whether a movement of the object across the zone is detected or not. If the judgment is positive, the robot proceeds to the process described in FIG. 5B. If the judgment is negative, the robot proceeds to a final step 506.

In step 506, the robot terminates the process mentioned above.

In step 507, the robot starts a subsequent process for changing a location of the boundary between zones.

In step 508, the robot may detect that the object moves out from the zone across a different boundary.

In step 509, the robot may change a location of the different boundary in a direction away from the object, compared to the location of the different boundary just before the change.

Alternatively, in step 508, the robot may detect that the moves out from the zone across the same boundary after the change made in step 504.

In this case, in step 509, the robot may change the location of the boundary after the change to the afore-mentioned same boundary location which was set in step 502 or to a boundary different from the boundary location which was set in step 502.

The change of the boundary may be made by reading information on a boundary location from the storage (591) and then setting the location of the boundary at the read boundary location using the information. Alternatively, the change of the boundary may be made by dynamically calculating each of the boundary location and then setting the location of the boundary at the calculated boundary location.

In step 510, the system terminates the process mentioned above.

With reference now to FIGS. 5C and 5D, FIG. 5C illustrates another embodiment of a flowchart of a process for changing a location of the boundary between zones and FIG. 5D illustrates an embodiment of a diagram according to the flowchart described in FIG. 5C.

Prior to explaining the flowchart described in FIG. 5C, the diagram described in FIG. 5D will be first explained.

Let us suppose that a robot (531) can detect three zones (1, 2, and 3) simultaneously by setting two boundaries.

In FIG. 5D, the following four zones are provided: Zone_A (541), Zone_B (542), Zone_C (543) and Zone_D (544). A robot (531) can identify the zone where the closest user is located from these four zones by setting boundaries for each zone dynamically.

Each zone has a plurality of boundaries and each boundary defines at least a part of the zone. Each boundary is defined using two boundary locations: i.e., an inside-boundary location and an outside-boundary location.

For Zone_A (541), two boundary locations, a (561) and b (562) are provided for the right boundary.

For Zone B (542), two boundary locations, c (563) and d (564) are provided for the boundary illustrated in the right side; and another two boundary locations, b (562) and a (561) are provided for the left boundary.

For Zone C (543), two boundary locations, e (565) and f (566) are provided for the boundary illustrated in the right side; and another two boundary locations, d (564) and c (563) are provided for the left boundary.

For Zone_D (544), two boundary locations, f (566) and e (565) are provided for the left boundary.

Let us suppose that the robot can identify three zones, zone_1, Zone_2 and Zone_3 by setting two boundaries B12-* and B23-*, as seen in FIG. 5D, 592.

Further, in a case where no user is in zone_1, one user is in zone_2 and two users are in zone_3, this situation can be hereinafter expressed as "Zone123=(0, 1, 2)".

In a case where nobody is in Zone_A (541), Zone_B (542) and Zone_C (543) but a user is in Zone_D (544), the robot (531) sets one boundary, B-23-e (572) for Zone_C (543) at the boundary location e (565), which corresponds to the inside-boundary location between Zone_C (543) and Zone_D (544), and also sets another boundary, B12-c (571), for Zone_C (543) at the boundary location c (563), which corresponds to the outside-boundary location between Zone_B (542) and Zone_C (543).

In step t1 (551), a user is now moving (581) into Zone_C (543) from Zone_D (544) across the boundary B23-e (572).

In step t2 (552), the robot (531) detects that the user moves into Zone_C (243) across the boundary B23-e (572) and then dynamically change the location of the boundary from the boundary B23-e (572) to the boundary B23-f (574).

Further, the user is now moving (582) into Zone_B (542) from Zone_C (543) across the boundary B12-c (573).

In step t3 (553), the robot (531) detects that the user moves into Zone_B (542) across the boundary B12-c (573) and then dynamically hands over the two boundaries from the boundaries B12-c (573) and B23-f (574) to the boundaries B12-a (575) and B23-d (576), respectively.

Further, the user is now moving (583) into Zone_A (541) from Zone_B (542) across the boundary B12-a (575).

In step t4 (554), the robot (531) detects that the user moves into Zone_A (541) across the boundary B12-a (575) and then dynamically changes the location of the boundary from the boundary B12-b (577) to the boundary B23-d (578). In this case, the boundary B23-d (578) is not changed and, further, the two boundaries B12-a (575) and B23-d (578) for Zone_B (542) are not handed over the boundaries for Zone_A (541).

With reference now to FIG. 5C, a robot or a computer system may be a subject of each step. Hereinafter, a subject of each step is described as the robot. However, explanations mentioned below are applied also to the computer system as the subject of each step.

In step 511, the robot starts the process for changing a location of the boundary between zones.

In step 512, the robot sets two boundaries, B12-c (571) and B23-e (572). See step t1 (551) described in FIG. 5D.

In step 513, the robot judges whether a condition, zone123=(0, 0, m), (m>=0), remains or not to know whether no user is in zone 1 nor 2. If the judgment is positive, the robot proceeds back to step 513. Meanwhile, if the judgment is negative, the robot proceeds to step 514, because the object is detected in zone 1 or 2.

In step 514, the robot sets two boundaries, B12-c (571) and B23-f (574). See step t2 (552) described in FIG. 5D.

In step 515, the robot judges whether a condition, zone123=(0, n, m), (m>=0, n>0), remains or not to know whether no user is in zone 1 and the closest user is a user in zone 2. If the judgment is positive, the robot proceeds back to step 515. Meanwhile, if the judgment is negative, the robot proceeds to step 516, because the closest object is moved from zone 2 having boundaries, B12-c (573) and B23-f (574).

In step 516, the robot judges whether a condition, zone123=(0, 0, m), (m>=0), remains or not to know whether no user is in zone 1 nor 2. If the judgment is positive, the robot proceeds back to step 512. Meanwhile, if the judgment is negative, the robot proceeds to step 517.

In step 517, the robot sets two boundaries, B12-a (575) and B23-d (576). See step t3 (553) described in FIG. 5D.

In step 518, the robot judges whether a condition, zone123=(0, n, m), (m>=0, n>0), remains or not to know whether the closest user is in zone 2. If the judgment is positive, the robot proceeds back to step 518. Meanwhile, if the judgment is negative, the robot proceeds to step 519, because the object is detected in zone 2 having boundaries, B12-a (575) and B23-d (576).

In step 519, the robot judges whether a condition, zone123=(0, 0, m), (m>=0), remains or not to know whether no user is in zone 1 nor 2. If the judgment is positive, the robot proceeds back to step 514. Meanwhile, if the judgment is negative, the robot proceeds to step 520.

In step 520, the robot sets two boundaries, B12-b (577) and B23-d (578). See step t4 (554) described in FIG. 5D.

In step 521, the robot judges whether a condition, zone123=(n, m, k), (k>=0, m>=0, n>0), remains or not to know whether the closest user is in zone 1. If the judgment is positive, the robot proceeds back to step 521. Meanwhile, if the judgment is negative, the robot proceeds back to step 517, because the object is detected in zone 1 having the boundary, B12-b (577).

Figure 6:
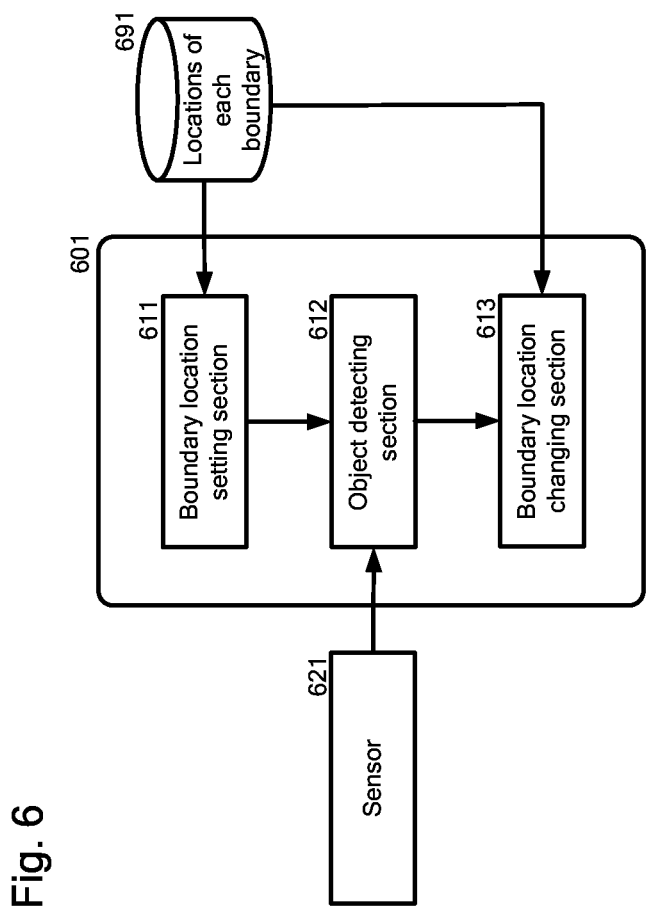
FIG. 6 illustrates an embodiment of an overall functional block diagram of a system which may be used in accordance with the embodiment of the flowchart described in FIGS. 2A, 2B, FIGS. 3A and 3B, and FIG. 4.

FIG. 6 illustrates an embodiment of an overall functional block diagram of a system which may be used in accordance with the embodiment of the flowchart described in FIGS. 2A and 2B, FIG. 3A and FIG. 4.

A robot or a computer system (601) may be used for changing a location of the boundary between zones, according to an embodiment of the present invention. Hereinafter, a subject of each step is described as the robot. However, explanations mentioned below are applied also to the computer system as the subject of each step.

In one embodiment, the robot (601) may comprise one or more sensors (621) and receive data from the sensors (621). In another embodiment, the robot (601) may receive data sent from one or more sensors (621) which is had by another system (not shown).

The robot (601) may comprise a boundary location setting section (611), an object detecting section (612) and a boundary location changing section (613).

The boundary location setting section (611) may set a boundary which defines at least a part of a zone.

The boundary location setting section (611) may perform step 502 described in FIG. 5A.

The object detecting section (612) may detect that an object moves into the zone across the boundary. The movement of the object is observed by movement of the object, the detector or a combination thereof. In a case where the object is a stationary object and the robot can move itself, the movement of the object can be observed when the robot moves and, therefore, an embodiment of the present invention can be applied in such case.

The object detecting section (612) may further detect that that the object moves out from the zone across a different boundary. The object detecting section (612) may alternatively detect that the object moves out from the zone across the boundary after the movement.

The object detecting section (612) may perform steps 503 and 505 described in FIG. 5A and step 512 described in FIG. 5B.

The boundary location changing section (613) may change the location of the boundary in a direction away from the object, compared to the location of the boundary before the change.

The boundary location changing section (613) may further change a location of the different boundary in a direction away from the object, compared to the location of the different boundary in response to the detection. The boundary location changing section (613) may alternatively change the location of the boundary after the change to the boundary location just before the change.

The boundary location changing section (613) may change the location of the boundary such that, in response to a detection that the object moves into another zone across a boundary between the another zone and a certain zone of the another zone from the certain zone, a size of the another zone increases.

The boundary location changing section (613) may hand over the two boundaries between zones among the plurality of zones in response to a detection of movement between the zones of the object. in a case where each of the plurality of zones is detected using two boundaries.

The boundary location changing section (613) may use a boundary which was set to a certain zone prior the movement for setting a location of a boundary which defines at least a part of another zone after the movement in response to a detection of a movement between the zones of the object.

The boundary location changing section (613) may perform step 504 described in FIG. 5A and step 513 described in FIG. 5B.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A system including a robot, the robot comprising:
    a processor; and
    a memory storing a program, which, when executed on the processor, performs an operation including:
        setting a first boundary location of a boundary which defines at least a part of a given one of a plurality of zones as an inside location of the boundary or an outside location of the boundary, the plurality of zones being defined using a distance from a robot;
        detecting that an object moves into or out of the given zone across the boundary at the first boundary location, including detecting a distance between the robot and the object using a sensor;
        implementing stable zone detection within the plurality of zones as a result of the detection of the object to provide a robotic service to the object, including reducing chattering problem effects associated with sensor noise during the zone detection by changing the first boundary location of the boundary to the outside location or the inside location based on whether the object moves into or out of the given zone to obtain a second boundary location; and
        providing the robotic service to the object according to a rule corresponding to the second boundary location.

2. The system according to claim 1, wherein the first boundary location is changed such that a size of the given zone increases.

3. The system according to claim 1, wherein the first boundary location is changed such that, in response to a detection that the object moves into another zone from the given zone, a size of the other zone increases.

4. The system according to claim 1, wherein the robot can identify the plurality of zones.

5. The system according to claim 1, wherein a number of boundaries settable for identifying the plurality of zones is limited, and
   in response to a detection of a movement of the object between the given zone and another zone, a boundary which was set to the given zone is used for setting a location of a boundary which defines at least a part of the other zone.

6. The system according to claim 1, wherein the first boundary location is changed to the outside location in response to detecting that the object moves into the zone across the boundary.

7. The system according to claim 1, wherein the first boundary location is changed to the inside location in response to detecting that the object moves out of the zone across the boundary.

8. The system according to claim 1, wherein the object is a user approaching the robot, and wherein the robotic service includes a manner of talking with the user.

9. A computer program product comprising a computer readable storage medium having program instructions embodied therewith, wherein the computer readable storage medium is not a transitory signal per se, the program instructions executable by a computer to cause the computer to perform a method comprising:
   setting, by a robot, a first boundary location of a boundary which defines at least a part of a given one of the plurality of zones as an inside location of the boundary or an outside location of the boundary, the plurality of zones being defined using a distance from a robot;
   detecting, by the robot, that an object moves into or out of the given zone across the boundary at the first boundary location, including detecting a distance between the robot and the object using a sensor;
   implementing, by the robot, stable zone detection with the plurality of zones as a result of the detection of the object to provide a robotic service to the object, including reducing chattering problem effects associated with sensor noise during the zone detection by changing the first boundary location of the boundary to the outside location or the inside location based on whether the object moves into or out of the given zone to obtain a second boundary location; and providing, by the robot, the robotic service to the object according to a rule corresponding to the second boundary location.

10. The computer program product according to claim 9, the first boundary location is changed such that a size of the given zone increases.

11. The computer program product according to claim 9, wherein the first boundary location is changed such that, based on a detection that the object moves into another zone from the given zone, a size of the other zone increases.

12. The computer program product according to claim 9, wherein the robot can identify the plurality of zones.

13. The computer program product according to claim 9, wherein a number of boundaries settable for identifying the plurality of zones is limited, and
   based on a detection of a movement of the object between the given zone and another zone, a boundary which was set to the given zone is used for setting a location of a boundary which defines at least a part of the other zone.

14. The computer program product according to claim 9, wherein the first boundary location is changed to the outside location based on detecting that the object moves into the zone across the boundary.

15. The computer program product according to claim 9, wherein the first boundary location is changed to the inside location based on detecting that the object moves out of the zone across the boundary.

16. The computer program product according to claim 9, wherein the object is a uber, and wherein the robotic service includes a manner of talking with the user.

* * * * *